United States Patent [19]

D'Amelia et al.

[11] Patent Number: 4,968,511

[45] Date of Patent: Nov. 6, 1990

[54] COMPOSITION AND PROCESS FOR ONE-STEP CHEWING GUM

[76] Inventors: Ronald P. D'Amelia, 1 Fox Pl., Hicksville, N.Y. 11801; Peter T. Jacklin, RD1 Box 2019, Lafayette, N.J. 07848; Michael Ferrotti, 404 Delar Pkwy., Franklin Park, N.J. 08823; Oscar Chantre, 77 S. Salem St., Dover, N.J. 07801; Richard Reggio, 12 Buttonwood Dr., Long Valley, N.J. 07853

[21] Appl. No.: 321,933

[22] Filed: Mar. 10, 1989

[51] Int. Cl.⁵ .............................................. A23G 3/30
[52] U.S. Cl. ........................................... 426/6; 426/4
[58] Field of Search ...................................... 426/3-6; 424/48

[56] References Cited

U.S. PATENT DOCUMENTS

| | | | |
|---|---|---|---|
| 2,596,852 | 5/1952 | Heggie et al. | |
| 3,159,491 | 12/1964 | Mahan et al. | |
| 3,268,496 | 8/1966 | Germain | 426/6 |
| 3,285,750 | 11/1966 | Ishida et al. | |
| 3,311,595 | 3/1967 | Kahrs et al. | 426/6 |
| 3,440,060 | 4/1969 | Rife | 426/6 |
| 3,473,932 | 10/1969 | Sirota et al. | 426/6 |
| 3,473,933 | 10/1969 | Sato et al. | 426/6 |
| 4,329,369 | 5/1982 | Tezuka et al. | |
| 4,357,355 | 11/1982 | Koch | 426/6 |
| 4,387,108 | 6/1983 | Koch | 426/6 |
| 4,452,820 | 6/1984 | D'Amelia et al. | 426/6 |
| 4,514,423 | 4/1985 | Tezuka et al. | |
| 4,525,363 | 6/1985 | D'Amelia et al. | |

FOREIGN PATENT DOCUMENTS 686750 9/1966 Belgium .
2830324 8/1979 Fed. Rep. of Germany .

*Primary Examiner*—Jeanette Hunter

[57] ABSTRACT

Chewing gum is made in a direct one-step process by mixing together at about 50° to 100° C. in weight %, about 5 to 25% of certain vinyl polymers, about 4 to 18% of plasticizer for each such vinyl polymers, about 2 to 11% of filler, about 30 to 60% of solid bulk sweetener, about 1 to 25% of liquid bulk sweetener, about 0 to 0.75% of intense sweetener, about 0.5 to 2.0% of flavorant, about 0 to 0.25% of colorant and about 0.5 to 5% of emulsifier.

17 Claims, No Drawings

COMPOSITION AND PROCESS FOR ONE-STEP CHEWING GUM

BACKGROUND OF THE INVENTION

1. Field of the Invention

The present invention relates to a composition and process for manufacturing chewing gum in a single compounding step.

2. Description of the Prior Art

Commercially useful chewing gum is made, for the most part, from a preformed chewing gum base which is compounded with various combinations of bulk sweeteners, modifying agents, intense sweeteners, coloring agents, flavorants and other materials. The chewing gum base, itself, is preformed from various combinations of masticatory materials, which are usually elastomeric polymers, plasticizers for the elastomer, detackifiers, plasticizers for the detackifiers, oleaginous materials such as waxes and fatty materials, mineral fillers and antioxidants.

The types, and amounts, of the various components used in making such chewing gum products, are disclosed, for example, in U.S. Pat. Nos. 4,452,820 and 4,525,363.

The manufacture of such prior art products thus requires the use of relatively large numbers of different components, some of which are used in one compounding procedure, i.e., for making the gum base, and others are, subsequently, used with the preformed gum base, in a second compounding operation, for making the desired chewing gum product.

These prior art gum base compounding procedures are usually conducted at elevated temperatures of about 200 to 280° F., and at steam pressures of about 0 to 70 psi, and require processing times of about 60 to 180 minutes, essentially because of the facts that the elastomer components of such systems have relatively high viscosities and melting points and relatively low glass transition temperatures. Thus, even when melted, they are difficult to process in conventional mixing equipment.

U.S. Pat. No. 3,440,060 discloses chewing gum products based on the use therein of certain co- and ter-ethylene vinyl acetate polymers containing, in weight %, about 1 to 40% ethylene, optionally, about 1 to 15% of a vinyl ester of a long-chain fatty acid, and the remainder, vinyl acetate. The chewing gum compositions made with these ethylene-vinyl acetate co-/ter-polymers were made in a one-step mixing operation under undefined conditions. Because of the poor characteristic physical properties of the ethylene-vinyl acetate co-/ter-polymers, and the poor gum formulation, used in making the chewing gum products disclosed in this patent, however, such chewing gum products have little or no current commercial utility because they are too brittle, and are difficult to process.

U.S. Pat. No. 3,473,933 discloses making a gum base composition by first polymerizing vinyl proprionate in the presence of some or all of the commonly used gum base components, and then separately compounding the thus preformed gum base with the remaining components of the chewing gum composition. This chewing gum making procedure also requires a multi-step compounding operation.

Certain polyvinyl acetate resins have also been used as the sole polymeric component of chewing gum products as disclosed, for example, in West German Patent No. 2,830,324 and Belgian Patent No 686,750.

Product brochures of Wacker Chemie GmbH, D-2000 Munich 22, Federal Republic of Germany, relating to their Vinnapas resins indicate that their vinyl acetate homopolymers and copolymers of vinylacetate with vinyl laurate are approved for use in chewing gum by the Federal Republic of Germany.

Attempts by the present inventors, however, to make useful chewing gum products using the Vinnapas copolymers in the formulations and one-step mixing procedures of U.S. Pat. No. 3,440,060 were unsuccessful in that unchewable, difficult-to-process chewing gum products were made.

It has not been possible, therefore, prior to the present invention to readily prepare commercially useful chewing gum products in a single compounding operation, at relatively low temperatures, with relatively few compounding materials, while employing vinyl resins as the sole polymeric component of such compositions.

An object of the present invention is to provide a composition and process for readily making commercially acceptable chewing gum products in a single compounding step wherein such compositions contain various vinyl resins as the major functional polymeric component thereof.

A further object of the present invention is to make chewing gum products that are shelf-stable, i.e., do not harden during storage, and in stick form, they remain flexible.

SUMMARY OF THE PRESENT INVENTION

It has now been found, according to the present invention, that commercially useful chewing gum products based on vinyl resins can be readily prepared in a one-step compounding process with relatively few compounding ingredients if certain vinyl resins are used as the major functional polymeric component of such compositions, as hereinafter described.

DESCRIPTION OF THE PREFERRED EMBODIMENT

The Chewing Gum Products

The chewing gum products of the present invention are prepared in a one-step mixing operation which is conducted at temperatures of about 50 to 100, and preferably of about 60 to 85° C. The mixing operation is conducted at atmospheric pressure and requires about 20 to 45 minutes of mixing time.

The chewing gum products of the present invention are formed by directly blending together the following amounts of the following components:

| Component of Chewing Gum Composition | Weight % of Component | |
|---|---|---|
| | Broad Range | Preferred Range |
| vinyl polymer | 5 to 25 | 8 to 20 |
| plasticizer for vinyl polymer | 4 to 18 | 5 to 15 |
| filler | 2 to 11 | 4 to 9 |
| solid bulk sweetener | 30 to 60 | 35 to 55 |
| liquid bulk sweetener | 1 to 25 | 5 to 15 |
| intense sweetener | 0 to .75 | 0 to 0.4 |
| flavorant | 0.5 to 2.0 | 0.7 to 1.3 |
| colorant | 0 to 0.25 | 0 to 0.2 |
| emulsifier | 0.5 to 5 | 1 to 4 |
| TOTAL | 100 | 100 |

The Vinyl Polymers

With respect to the description of the vinyl polymers used in the chewing gum products of the present invention, the following definitions apply:

Intrinsic viscosity is the reduced viscosity of the polymer in acetone at 25° C. at infinite dilution. The determination of intrinsic viscosity is described in a pamphlet published by Union Carbide Plastics Company, a division of Union Carbide Corporation, Jan. 22, 1960, entitled "Information Test Method, No. 23-262-l0A".

Glass transition temperature—Tg—is a characteristic temperature at which glassy amorphous polymers become flexible or rubberlike because of the onset of segmental motion. This temperature is determined using a calibrated differential scanning calorimeter (DSC) on 25 mg. of sample with a heating rate of 10° C. per minute.

Mn is the number average molecular weight of the polymer and is dependent on the number of polymer molecules present.

Mw is determined from experiments in which each polymer molecule makes a contribution to the measured results. It is more dependent on the number of heavier molecules than Mn.

Both Mn and Mw are determined on a 150 mg. sample of polymer in 25 cc of solvent (tetrhydrofuran). 400 ul is injected into a calibrated gel permeation chromatograph (GPC) device equipped with ultra styragel columns of various porosities and also equipped with RI (refractive index) and ultra violet light detectors.

Plasticity is the height, in millimeters, of a 2.0 gram solid ball of polymer after 15 minutes of heating at 50° C. under a 5 kilogram load in a Williams Parallel Plate Plastometer.

The vinyl polymers which are used in the chewing gum compositions of the present invention fall into four general categories, as follows:

1. homopolymers of vinyl alkyl esters
2. copolymers of two vinyl alkyl esters
3. copolymers of ethylene and one vinyl alkyl ester
4a. terpolymers of vinyl alcohol, ethylene and one vinyl alkyl ester
4b. terpolymers of vinyl alcohol, and two vinyl alkyl esters The polymers of these four general categories are more fully defined as follows:

Homopolymers of Vinyl Alkyl Esters

The vinyl alkyl ester homopolymers have the general formula:

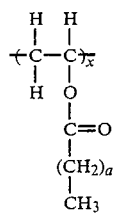

I wherein
  [a] is a whole number of 1 to 8, and
  [x] is a whole number signifying the total number of vinyl ester units which are present in such I homopolymers and is such as to satisfy the molecular weight characteristics of such polymers as noted below.

The vinyl alkyl ester units are the only monomer units present in such I homopolymers.

The I homopolymers may be made by the direct, or trans-, esterification of a polyvinyl alcohol homopolymer having an intrinsic viscosity, in water at 25° C., of about $0.40\pm.05$. The polyvinyl alcohol homopolymer precursors have a Mn value of about $16,000\pm3,000$ and an Mw value of about $25,000\pm5,000$. The esterification reactions are conducted under reflux at about 140 to 210° C. with the alkyl anhydrides that will provide the desired pendant acid moieties.

The polyvinyl alkyl ester homopolymers generally have an intrinsic viscosity [n] of about 0.20 to 0.50, and preferably of about 0.29 to 0.37, as determined in acetone at 25° C. The glass transition temperatures, Tg, for these polymers, as determined by DSC (differential scanning calorimeter), are in the range of about $-50°$ C. to about $+40°$ C., and preferably are about $-25°$ C. to about $+15°$ C. The Mn value of these polymers is in the range of about 25,000 to about 55,000 MWU (molecular weight units), and preferably from about 30,000 to about 50,000 MWU. The Mw value of these polymers is about 80,000 to about 150,000 MWU, and is preferably about 100,000 to about 130,000 MWU. The preferred polyvinyl alkyl ester homopolymer is poly vinyl proprionate.

Copolymers of Vinyl Alkyl Esters

The vinyl alkyl ester copolymers of the present invention are random copolymers which have the general formula:

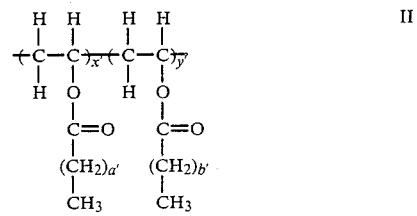

II wherein
  [a'] is 0 or 1
  [b'] is a whole number of 1 to 16, with the proviso that a' and b' cannot both be 1, and
  [x'] and [y'] are whole numbers signifying the number of lower (wherein [a'] is as defined) and higher (wherein [b'] is as defined) vinyl ester units, respectively, which are present in the II copolymer and are such as to satisfy the molecular weight characteristics of such II copolymers and with the provisos that [x'] and [y'] shall represent the total number of monomer units in such II copolymers and that the [x'] units shall represent about 10 to 90% of the copolymer's total monomer units and that [y'] units shall represent about 90 to 10%, respectively, of the copolymer's total monomer units.

These vinyl alkyl ester copolymers have a Mn value of about 2,000 to 60,000 MWU and preferably of about 6,000 to 50,000 MWU. The Mw value of these polymers is about 4,000 to 200,000 MWU and is preferably between about 20,000 and 180,000 MWU.

These vinyl alkyl ester copolymers may be made by the direct, or trans-, esterification of random preformed vinyl alcohol-vinyl acetate copolymers or vinyl alcohol-vinyl proprionate copolymers having molar ratios varying from 10 to 90% vinyl acetate or vinyl proprionate content and 90 to 10% vinyl alcohol content. The esterification reactions may be conducted by reacting these vinyl alcohol copolymers with alkyl anhydrides to provide the desired pendant fatty acid residues in such formulas, i.e.,

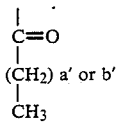

These reactions are conducted under reflux conditions at a temperature of about 170 to about 220° C. These II copolymers have essentially no vinyl alcohol residues when made by such esterification routes. Some of these copolymers are also commercially available. A preferred copolymer of this category is the B100/20 and B500/20 polymers sold by Wacker Chemie which contains about 20% vinyl laurate and about 80% vinyl acetate. The Mn of the Wacker Chemie B100/20 polymer is about 20,000 MWU and its Mw value is about 111,000 MWU. The Mn of the Wacker Chemie B500/20 polymer is about 22,000 MWU and its Mw value is about 180,000.

Copolymers of Ethylene and Vinyl Alkyl Esters

The ethylene-vinyl alkyl ester copolymers of the present invention are random copolymers which have the general formula:

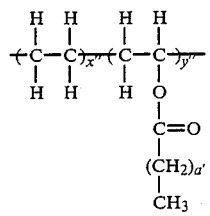

III wherein

[a''] is 0 or a whole number of 1 to 16, and

[x''] and [y''] are whole numbers signifying the numbers of ethylene and vinyl ester units, respectively, which are present in the III copolymers and are such as to satisfy the molecular weight characteristics of such III copolymers and with the provisos that [x''] and [y''] shall represent the total number of monomer units in such III copolymers and that the [x''] units shall represent about 5 to 40% of the copolymer's total monomer units and that the [y''] units shall represent about 95 to 60%, respectively, of the copolymer's total monomer units. Only one vinyl alkyl ester is used in the III copolymers.

These III copolymers may be made by the direct, or trans-, esterification of preformed, random, ethylene-vinyl alcohol copolymers having molar ratio contents of about 60 to 95% vinyl alcohol and about 40 to 5% ethylene.

The esterification reactions are conducted at reflux conditions of about 170 to 200° C. by reacting the ethylene-vinyl alcohol copolymers with alkyl anhydrides to provide the desired pendant fatty acid residues in such III structures, i.e.,

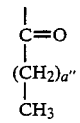

The resulting III structure copolymers contain essentially no vinyl alcohol residues when made by such esterification routes. Some of the III structure copolymers are also commercially available, as from Scientific Polymer Products (SP²), Ortano, N.Y., Mobay Chemical Corp., of Pittsburgh, Pa. and Sekesui of Japan.

SP² has available an ethylene-vinyl acetate copolymer which has a vinyl acetate content of about 70% and an ethylene content of about 30%. This copolymer has a Mooney viscosity value of 20 (ML-4 at 100° C.), a density of 1.06, a [n] in toluene at 25° C. of 0.94 and a plasticity of 8.

The commercially available ethylene-vinyl acetate copolymer from Mobay Chemical Corporation has a vinyl acetate content of about 70% and an ethylene content of about 30%. The density of this copolymer if 1.06 and its melt index (ASTM D-1238,77T) in gm/10 minutes, is 15-25.

Sekesui has a commercially available ethylene-vinyl acetate copolymer which has a vinyl acetate content of about 70% and an ethylene content of about 30%. This resin has a Mn of about 20,000 and a Mw of about 400,000.

The III copolymers have an Mn value of about 15,000 to about 75,000 MWU, and preferably of about 20,000 to 55,000 MWU. They have an Mw value of about 100,000 to about 450,000 MWU and preferably of about 125,000 to about 400,000 MWU.

IV. Terpolymers of Ethylene, Vinyl Esters And Vinyl Alcohol

The IV terpolymers of the present invention have the general formulae:

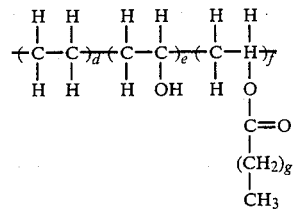

IVa wherein

[g] is a whole number of 0 to 16,

[d], [e] and [f] are whole numbers signifying the number of ethylene, vinyl alcohol and vinyl ester units, respectively, which are present in terpolymer IVa and are such as to satisfy the molecular weight characteristics of such IVa copolymers and with the provisos that [d]+[e]+[f] shall represent the total number of monomer units in such IVa copolymers and that the [d] units shall represent about 5 to 20% of the copolymer's total monomer units, the [e] units shall represent about 5 to 20%, and preferably about 5 to 10%, of the copolymer's total monomer units, and the [f] units shall represent about 60 to 90%, respectively, of the copolymer's total monomer units; OR

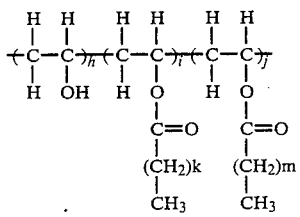 IVb wherein

[k] is a whole number of 0 or 1

[m] is a whole number of 1 to 16 with the proviso that [k] and [m] are not both 1, and

[h], [i] and [j] are whole numbers signifying the number of vinyl alcohol and lower (wherein [k] is as defined) and higher (wherein [m] is as defined) vinyl ester units, respectively, which are present in terpolymer IVb and are such as to satisfy the molecular weight characteristics of such IVb copolymers and with the provisos that [h]+[i]+[j] shall represent the total number of monomer units in such IVb copolymers and that the [h] units shall represent about 5 to 20, and preferably about 5 to 10, % of the copolymer's total monomer units, the [i] units shall represent about 60 to 90% of the copolymer's total monomer units and the [j] units shall represent about 5 to 20%, respectively, of the copolymer's total monomer units. Two vinyl esters are used in the IVb terpolymers and one vinyl ester is used in the IVa terpolymers.

The IVa terpolymers may be made by the partial hydrolysis of some of the pendant vinyl ester moieties in a type III copolymer and the IVb terpolymers may be made by the partial hydrolysis of some of the pendant ester moieties in a type II copolymer. The hydrolysis reactions are conducted at about 40 to 70° C. in a solvent such as methanol using potassium or sodium hydroxide as a catalyst.

The IVa terpolymers have an Mn value of about 8,000 to about 73,000 MWU and preferably of about 15,000 to 50,000 MWU. The IVa terpolymers have an Mw value of about 95,000 to 440,000 MWU, and preferably of about 110,000 to 380,000 MWU.

The IVb terpolymers have a Mn value of about 1,000 to about 55,000 MWU and preferably of about 5,000 to 45,000 MWU. The IVb terpolymers have a Mw value of about 2,000 to about 180,000 and preferably of about 15,000 to 170,000 MWU.

Two or more of the I to IV polymers can be used together in lieu of the use of only one of such polymers.

The plasticizer used for the vinyl polymers in the compositions of the present invention would include glycerol triacetate, acetylated glycerides, (oligomeric) vinyl polymers having a molecular weight of about 1,000 to 10,000 MWU, squalene, tributyl acetyl citrate, tributyl citrate, glyceryl tributyrate, propylene glycol monostearate, propylene glycol monolaurate, diacetyl tartaric acid esters of mono- and di-glycerides of edible fat oils or edible fat forming acids and polylimonene.

The lower molecular weight IV terpolymers may also be used for plasticizing purposes. However, where the IV terpolymers are used, for masticatory and/or plasticizing purposes, the total content of such IV terpolymers should not exceed 25 weight % of the chewing gum formulation.

The preferred plasticizers are glycerol triacetate, acetylated glycerides and oligomeric vinyl polymer.

The plasticizers may be used individually or in various combinations thereof.

The filler used in the compositions of the present invention would include all those fillers known to be useful in chewing gum composition including inorganic mineral fillers such as calcium carbonate, titanium dioxide, talc, alumina and tricalcium phosphate. Organic fillers may also be used such as cellulose fibers.

The fillers may be used individually or in various combinations thereof.

The bulk sweeteners used in the chewing gum composition of the present invention may be used in dry solid form, or in the form of aqueous solutions or syrups.

Such bulk sweeteners would include, but not be limited to, all those commonly used in chewing gum compositions including sugars such as dextrose, fructose, sucrose, sugar alcohols such as sorbitol, xylitol and mannitol, hydrogenated starch hydrolysates, corn syrups, sorbitol solution and glycerol.

Intense or artificial sweetening agents may also be used in combination with the bulk sweeteners. The intense or artificial sweeteners may include but would not be limited to aspartame, the free acid form of saccharin, sodium, calcium or ammonium saccharin salts, dihydrochalcones, glycyrrhizin, dipotassium glycyrrhizin, glycyrrhizic acid/ammonium salt, talin, acesulfame K, *Stevia rebaudiana* (Stevioside), *Richardella dulcifica* (Miracle Berry), *Dioscoreophylim cumminisu* (Serendipity Berry) and free cyclamic acid and cyclamate salts, sucralose and alitmane.

The bulk and intense sweeteners may be used individually and/or in various combinations with each other.

The chewing gum compositions of the present invention may also be made with conventional FD&C and natural coloring agents.

The flavoring which can be included in the chewing gum compositions made according to this invention can comprise one or more natural and/or synthetic flavors and/or oils derived from plants, leaves, flowers and fruit. Representative flavors and oils of these types include acids such as adipic, succinic and fumaric acid; citrus oils such as lemon oil, orange oil, lime oil and grapefruit oil; fruit essences, such as apple essence, pear essence, peach essence, strawberry essence, apricot essence, raspberry essence, cherry essence, plum essence and pineapple essence; essential oils such as peppermint oil, spearmint oil, mixtures of peppermint oil and spearmint oil, clove oil, bay oil, anise oil, oil of nutmeg, oil of sage, oil of bitter almonds, cassia oil and methylsalicylate (oil of wintergreen). Various synthetic flavors, such as those for a mixed fruit, may also be incorporated in the chewing gum with or without conventional preservatives.

The emulsifiers which may be used in the chewing gum compositions of the present invention would include lecithin and acetylated glycerides and mixtures thereof.

The chewing gum compositions of the present invention are thus not made with various other materials that have been conventionally used in making commercially useful chewing gum products, such as, preformed gum base; natural or synthetic elastomers; plasticizers for the elastomers (i.e., ester gums and polyterpene resins); and oleaginous materials such as waxes, oils and fats.

The following examples are merely illustrative of the present invention and are not intended as a limitation upon the full scope thereof.

EXAMPLE I

In this example, chewing gum was made from a Category I type vinyl polymer (polyvinyl alkyl ester homopolymer). The homopolymer was polyvinyl proprionate (PVPROP) which has an Mw of about 100,000. The PVPROP was prepared as disclosed in Example 34 below.

A single-step unit chewing gum was prepared as described below according to the following formula:

|  | Parts by Weight |
|---|---|
| polyvinyl proprionate (Mw = 100,000) | 21 |
| acetylated glyceride | 8 |
| $CaCO_3$ | 8 |
| sugar | 48 |
| corn syrup | 13 |
| peppermint flavor | 1 |
| lecithin | 1 |
|  | 100 |

The ingredients were mixed in a Brabender Plasticorder at a temperature of about 65° C. by adding all of the polyvinyl proprionate until it reached operating temperature. Then ½ the amount of CaCO3 and acetylated glyceride and all of the lecithin were added in sequence until a uniform mass was obtained. It was mixed for 1-2 minutes. Half of the sugar was then added to the mixture until a very continuous homogeneous phase was obtained. The remaining $CaCO_3$, acetylated glyceride and sugar were added sequentially. This step takes approximately 1-2 minutes. The entire amount of liquid corn syrup was then added and the mixture was blended for 10-15 minutes after which all the flavor was added and the entire mixture was blended again for 2 minutes.

The resulting chewing gum product processed (rolled) well. The gum had soft texture, good organoleptic qualities, no off-notes and good shelf life.

EXAMPLES II to XII

In these examples, chewing gum products were made from a Category II Type vinyl polymer (Polyvinyl alkyl ester copolymer).

The preferred vinyl polymer from this category is a vinylacetate-vinyl laurate copolymer having a vinyl laurate content of approximately 20%. The actual vinyl resin used was made by Wacker Chemie. It is called Vinnapas B100/20 and has a Mw of 112,000 by GPC.

The formulations for eleven products of the single-step unit chewing gum process that were made using the B100/20 Wacker Chemie vinyl acetate-vinyl laurate polyvinyl alkyl ester copolymer are shown in Table I. The amounts of the components used in the Table I formulations are in parts by weight (pbw).

All of the products were prepared as follows.

2.0 kilograms batches were made in a sigma blade mixer. The mixer was preheated for 15 minutes with full steam prior to adding any components thereto. The vinyl acetate-vinyl laurate copolymer and the oligomeric polyvinyl acetate were added to the heated kettle. After approximately 6 minutes of kneading all of the $CaCO_3$ filler was added. This was followed with the full addition of glycerol triacetate and acetylated glyceride. Cooling $H_2O$ was then turned on to lower the mixer temperature. At about 14 minutes into the mixing cycle all of the bulk sweetener and flavor were added sequentially, followed by all of the liquid sweetener. For the chewing gum products made with sugar, the reverse was done. The last component that was added before emptying the admixed composition from the mixer was the intense sweetener. Overall mixing times were from 20-30 minutes, the highest temperatures reached were 200° F.-225° F., and the finished gum temperatures were 136° F.-148° F. All the resulting chewing gum products had good body, and they rolled and slabbed well. Wrapperability was also good. They all had a soft texture and hydrated quickly in the mouth.

TABLE I

|  | Ex. II | Ex. III | Ex. IV | Ex. V | Ex. VI | Ex. VII | Ex. VIII | Ex. IX | Ex. X | Ex. XI | Ex. XII |
|---|---|---|---|---|---|---|---|---|---|---|---|
| B 100/20 VA-VL copolymer | 13.0 | 13.0 | 13.0 | 13.0 | 13.0 | 13.0 | 13.0 | 13.0 | 13.0 | 13.0 | 10.0 |
| Oligomeric PVAC | 13.0 | 13.0 | 13.0 | 13.0 | 13.0 | 13.0 | 13.0 | 13.0 | 13.0 | 13.00 | 16.00 |
| glycerol triacetate | 1.3 | 1.3 | 1.3 | 1.3 | 1.3 | 1.3 | 1.3 | 1.3 | 1.3 | 1.3 | 2.3 |
| $CaCO_3$ | 9.0 | 9.0 | 9.0 | 9.0 | 9.0 | 9.0 | 9.0 | 9.0 | 9.0 | 9.0 | 8.0 |
| acetylated glyceride | 4.0 | 4.0 | 4.0 | 4.0 | 4.0 | 4.0 | 4.0 | 4.0 | 4.0 | 4.0 | 4.0 |
| peppermint oil flavor | 1.2 | 1.2 | 1.2 | 1.2 | 1.2 | 1.2 | 1.2 | 1.2 | 1.2 | 1.2 | 1.2 |
| sugar | 46.50 | 46.50 | 55.5 | 46.5 | 52.5 | — | — | — | — | — | — |
| sorbitol | — | — | — | — | — | 41.3 | — | 53.3 | 41.3 | 44.3 | 50.3 |
| corn syrup | 12.0 | — | — | — | — | — | — | — | — | — | — |
| sorbitol solution | — | 12.0 | — | — | — | 17.0 | 15.0 | — | — | — | 3.0 |
| glycerine | — | — | 3.0 | — | — | — | — | 5.0 | — | — | 5.0 |
| lycasin conc.* | — | — | — | 12.0 | — | — | — | — | 17.0 | — | — |
| lycasin** | — | — | — | — | 6.0 | — | — | — | — | 14.0 | — |
| xylitol | — | — | — | — | — | — | 43.3 | — | — | — | — |
| Na saccharine | — | — | — | — | — | 0.22 | 0.22 | 0.22 | 0.22 | 0.22 | 0.18 |

* = hydrogenated starch hydrolysate (10% $H_2O$)
** = hydrogenated starch hydrolysate (30% $H_2O$)

EXAMPLE XIII TO XVI

In these examples, chewing gum products were made from other examples of Category II-Polyvinyl Alkyl Ester-Polyvinyl Alkyl Ester Copolymers. The formulations used in making the single step unit chewing gum products are shown in Table II below. The amounts of the components used in the Table II formulations are in parts by weight.

The chewing gum products were prepared in a Brabender mixer using procedures described in Example 1 above.

TABLE II

|  | Ex. XIII | Ex. XIV | Ex. XV | Ex. XVI |
|---|---|---|---|---|
| vinyl acetate-vinyl proprionate copolymer (60/40 Ratio) Mw 154,000 | 18 | — | — | — |
| vinyl acetate-vinyl proprionate copolymer (82/18 Ratio) Mw 60,000* | — | 18 | — | — |
| vinyl acetate-vinyl proprionate copolymer (25/75 Ratio) Mw 25,300 | — | — | 20 | — |
| vinyl acetate-vinyl laurate copolymer Wacker Chemie B500/20 Resin Mw 160,000 | — | — | — | 16.0 |
| Oligomeric PVAC (Mw 7,000) | — | — | — | 10.0 |
| glycerol triacetate | 5.0 | 4.0 | — | 5.0 |
| acetylated glyceride | 4.0 | 5.0 | 8.0 | — |
| $CaCO_3$ | 8.0 | 8.0 | 7.0 | 5.0 |
| Sugar | 50.0 | 48.0 | 48.0 | 50.5 |
| Corn Syrup | 10.0 | 12.0 | 12.0 | 7.0 |
| Glycerol | 3.0 | 3.0 | 3.0 | 5.0 |
| Peppermint Oil Flavor | 1.0 | 1.0 | 1.0 | 1.0 |
| Lecithin | 1.0 | 1.0 | 1.0 | 0.5 |

*prepared as disclosed in Example 35 below.

The chewing gum products of Examples XIII to XVI had a soft texture and good organoleptic properties.

EXAMPLES XVII to XXVII

In these examples, chewing gum products were prepared from a Category III Type vinyl polymer, the Ethylene-Polyvinyl Alkyl Ester Copolymers.

The preferred vinyl polymer from this category is an ethylene-vinyl acetate copolymer (EVAC) having a vinyl acetate content of approximately 70%. The copolymer can be purchased from SP², Mobay or Sekesui. The weight average molecular weight of the SP² product, by GPC, ranges from 150,000 to 400,000.

The formulations for eleven (11) products of the single-step unit chewing gum process that were made using the SP² EVAC (70% VA) polymer are shown in Table III below. The amounts of the components used in the Table III formulations are in parts by weight.

All of the products were prepared as follows:

2.0 kilograms batches were made in a sigma blade mixer. The mixer was preheated for 20 minutes with full steam prior to adding any components thereto. The ethylene-vinyl acetate copolymer and the oligomeric PVAC resin were added to the preheated mixer. After approximately 3 minutes, all of the $CaCO_3$ filler was added. This was followed by the full addition of glycerol triacetate and acetylated glyceride. At approximately 13 minutes into the procedure, cooling $H_2O$ was thus turned on to lower the mixer temperature. At 15 minutes, all of the bulk sweetener and liquid flavor were added, followed by all of the liquid sweetener. For the chewing gum products made with sugar, the reverse was done. The last component to be added before emptying the admixed composition from the mixer was the intense sweetener.

All of the products of Examples XVII to XXVII had a soft texture and good organoleptic properties.

TABLE III

|  | Ex. XVII | Ex. XVIII | Ex. XIX | Ex. XX | Ex. XXI | Ex. XXII | Ex. XXIII | Ex. XXIV | Ex. XXV | Ex. XXVI | Ex. XXVII |
|---|---|---|---|---|---|---|---|---|---|---|---|
| Ethylene vinyl acetate copolymer | 10.00 | 10.00 | 10.00 | 10.00 | 10.00 | 10.00 | 10.00 | 10.00 | 10.00 | 10.00 | 10.0 |
| Oligomeric PVAC | 16.00 | 16.00 | 16.00 | 16.00 | 16.00 | 16.00 | 16.00 | 16.00 | 16.00 | 16.00 | 16.0 |
| glycerol triacetate | 1.30 | 1.30 | 1.30 | 1.30 | 1.30 | 1.30 | 1.30 | 1.30 | 1.30 | 1.30 | 2.3 |
| $CaCO_3$ | 9.00 | 9.00 | 9.00 | 9.00 | 9.00 | 9.00 | 9.00 | 9.00 | 9.00 | 9.00 | 8.0 |
| acetylated glyceride | 4.00 | 4.00 | 4.00 | 4.00 | 4.00 | 4.00 | 4.00 | 4.00 | 4.00 | 4.00 | 4.0 |
| peppermint oil flavor | 1.20 | 1.20 | 1.20 | 1.20 | 1.20 | 1.20 | 1.20 | 1.20 | 1.20 | 1.20 | 1.2 |
| sugar | 46.50 | 46.50 | 55.50 | 52.50 | 46.50 | — | — | — | — | — | — |
| sorbitol | — | — | — | — | — | 41.70 | — | 53.70 | 44.70 | 41.70 | 50.30 |
| corn syrup | 12.0 | — | — | — | — | — | — | — | — | — | — |
| sorbitol solution | — | 12.00 | — | — | — | 17.00 | 15.00 | — | — | — | 3.0 |
| glycerine | — | — | 3.00 | — | — | — | — | 5.00 | — | — | 5.00 |
| lycasin* | — | — | — | 6.0 | — | — | — | — | 14.0 | — | — |
| lycasin conc.** | — | — | — | — | 12.00 | — | — | — | — | 17.00 | — |
| xylitol | — | — | — | — | — | — | 43.5 | — | — | — | — |
| Na saccharin | — | — | — | — | — | 0.22 | 0.22 | 0.22 | 0.22 | 0.22 | 0.18 |

\* = hydrogenated starch hydrolysate (10% $H_2O$)
\*\* = hydrogenated starch hydrolysate (30% $H_2O$)

EXAMPLE XXVIII

In this example, a chewing gum product was made from a Category III copolymer, using the following formulations, in pbw.

| Ethylene-Vinyl Proprionate 32/68 copolymer, Mw 125,000-made as disclosed in Example XXXVI below | 18.0 |
|---|---|
| Glycerol Triacetate | 4.0 |
| Acetylated Glyceride | 5.0 |
| $CaCO_3$ | 8.0 |
| Sugar | 50.0 |
| Corn Syrup | 10.0 |
| Glycerol | 3.0 |
| Lecithin | 1.0 |
| Peppermint Flavor | 1.0 |

EXAMPLE XXIX

In this example, a chewing gum product was made from a Category IVb type vinyl polymer using the following formulation, in pbw.

| Vinyl Acetate/Vinyl Laurate/Vinyl Alcohol Terpolymer (made by 5% hydrolysis of Vinnapas B/500/20VL | 20% |
|---|---|
| $CaCO_3$ | 11 |
| Corn Syrup | 10 |
| Sugar | 38 |
| Glycerol Triacetate | 6.0 |
| Glycerine | 14.0 |
| Peppermint Oil | 1.0 |

The vinyl acetate/vinyl laurate/vinyl alcohol terpolymer contains 5 mol % of vinyl alcohol.

EXAMPLE XXX

In this example, a chewing gum product was made from a Category IVa type vinyl polymer using the following formulation, in pbw:

| | |
|---|---|
| Ethylene/VAC/VOH terpolymer | 10.0 |
| PVAC (MW 10,000) | 16.0 |
| Glycerol Triacetate | 5.0 |
| CaCO$_3$ | 5.0 |
| Sugar | 47.0 |
| Corn Syrup | 10.0 |
| Glycerine | 5.0 |
| Lecithin | 1.0 |
| Peppermint Oil | 1.0 |

The terpolymer used contained 5 mol % vinyl alcohol.

EXAMPLE XXXI

In this example, a chewing gum product was made from a Category IVa type terpolymer using the following formulation, in pbw:

| | |
|---|---|
| Ethylene/VAC/VOH | 16.0 |
| PVAC (Mw 5,000) | 10.0 |
| Glycerol Triacetate | 4.0 |
| CaCO$_3$ | 10.0 |
| Sugar | 43.0 |
| Corn Syrup | 10.0 |
| Glycerol | 5.7 |
| Lecithin | 0.3 |
| Peppermint Oil | 1.0 |

All the products of Examples XXVIII to XXXI were made in a 100 gm mixing bowl using a Brabender Plasticorder Unit. The procedure is, otherwise, essentially the same as outlined in Example I above.

All of the products of Examples XXVIII to XXXI were of a soft texture. They also had good organoleptic properties, no off-notes and good shelf life.

EXAMPLES XXXII AND XXXIII

In these Examples XXXII and XXIII, chewing gum products were prepared from chewing gum composition A of U.S. Pat. No. 3,440,060, as follows, in grams:

| | |
|---|---|
| *ethylene/vinyl acetate copolymer 70% VAC | 25.0 grams |
| corn syrup | 25.0 grams |
| sugar | 48.0 grams |
| peppermint oil | 2.0 grams |

*Scientific Polymer Product Inc., Cat #786

EXAMPLE XXXIII

| | |
|---|---|
| Wacker Chemie B100/20VL | 25.0 grams |
| corn syrup | 25.0 grams |
| sugar | 48.0 grams |
| peppermint oil | 2.0 grams |

Both of the chewing gum products made using the formulations above were too hard, difficult to process and roll and could not be chewed.

EXAMPLE XXXIV

Synthesis of Polyvinyl Proprionate (PVPROP) from Polyvinyl Alcohol (PVOH) of MW 16000

PVPROP resin was synthesized from PVOH using a direct esterification method involving proprionic anhydride and heat. The starting material in this reaction was polyvinyl alcohol purchased from Scientific Polymer Products with a molecular weight of 16000 and an intrinsic viscosity in water at 25° C. of 0.444. A weight of 5 grams was placed in a 250 ml. round bottomed flask and 50 mls. of proprionic anhydride (purchased commercially from Aldrich) was added along with a magnetic stirrer. The flask was then connected to a reflux condenser and heat was applied by means of a heating mantle that was controlled by a voltage regulator. With constant stirring, enough heat was applied to bring the mixture to reflux. This took place at approximately 170-180 degrees centigrade. Refluxing continued for six hours at which time heat was discontinued and the solution was cooled to ambient temperature. The solution was then transferred to a 500 ml. separatory funnel with the help of approximately 100 mls. of hot toluene. The solution was allowed to cool down to ambient temperature. Toluene was used because all products except unreacted polyvinyl alcohol are soluble in it. The products and byproducts are polyvinyl proprionate, unreacted PVOH, unreacted proprionic anhydride, proprionic acid, and water. Approximately 200 mls. of water was added to the separatory funnel. The solution was shaken and allowed to stand. Separation was difficult due to the emulsion that formed. After separation, the bottom water layer was removed and the pH was checked with pH paper. If found to be acidic, more water was added to the remaining solution and the procedure was repeated. About 10×200 mls. of water was needed to clean the product. Next, the remaining product was transferred to a petrie dish where it was heated over low heat on a hot plate to remove any remaining water and toluene by evaporation. Finally, the petrie dish was placed in a vacuum oven overnight at 100 degrees centigrade. It is important to note that although only 10 mls. of proprionic anhydride was needed to perform the reaction stoichiometrically, 50 mls. was used in order to drive the equilibrium reaction in the desired direction.

EXAMPLE XXXV

Synthesis of PVAC 82—PVPROP 18% Copolymer

The starting material used in this reaction was a vinyl acetate/vinyl alcohol copolymer obtained from Scientific Polymer Products that had a vinyl acetate content of 82%. This material was a 28% solution by weight in methyl acetate. The methyl acetate was removed by drying the solution in a vacuum oven at 105 degrees centigrade overnight. The remaining solid material was polyvinyl acetate/polyvinyl alcohol copolymer having a monomer ratio of 82% and 18%, respectively. Approximately 5 grams of this material was weighed into a 250 ml. round bottomed flask along with a magnetic stir bar and 50 mls of proprionic anhydride. The 50 mls. of proprionic anhydride represented an amount that was in excess of that needed stoichiometrically for the reaction but was used to drive the equilibrium reaction in the desired direction. The flask containing this mixture was attached to a reflux condenser and heat was applied to the system by means of a heating mantle controlled by a voltage regulator. Heat was applied and the mixture was brought to reflux. Reflux took place at approximately 170-180 degrees centigrade. Stirring was constant throughout refluxing. The sample was allowed to reflux for five hours and then heat was removed and the sample was allowed to cool to ambient temperature. Clean-up consisted of transferring the reaction product to a separatory funnel with the aid of 100 mls. of hot toluene. After cooling to ambient temperatures, 200 mls. of water was added to this solution and the total contents were shaken. An emulsion formed that took hours to break, but after it did, the bottom water layer was removed. The pH of the discarded water was tested using pH paper. If the water was found to be acidic, more water was added and the procedure was repeated. Approximately 10×200 mls. of water were needed to clean the product. After the water extraction, the remaining product was transferred to a petrie dish and the petrie dish was placed on a hot plate over low heat to evaporate the remaining water and toluene. Finally, the petrie dish was placed in a vacuum over at 105 degrees centigrade overnight. This polymer was used in Example XIV above. The polymers used in Examples XIII and XV may be synthesized in the same way as was the Example XIV polymer using appropriate starting materials.

EXAMPLE XXXVI

Synthesis of Polyethylene 32% Polyvinyl Proprionate 68% Copolymer

The starting material used in this reaction was a poly(ethylene-vinyl alcohol) copolymer containing the monomer units in a molar ratio of 32%–68% respectively. This material was obtained commercially from Polysciences, Inc. of Warrington, Pa. Approximately 25 grams of this material was accurately weighed into a 250 ml. round bottomed flask along with a magnetic stir bar and 130 mls. of proprionic anhydride. The 130 mls of proprionic anhydride represented an amount in excess of that needed to run the reaction stiochiometrically, but was used to drive the equilibrium reaction in the desired direction. The flask containing this mixture was attached to a reflux condenser and heat was applied to the system by means of a heating mantle that was controlled by a voltage regulator. Heat was applied and the mixture was brought to reflux. Reflux took place at approximately 170-180 degrees centigrade. The sample was allowed to reflux for 18 hours and then heat was removed and the flask was cooled to ambient temperature. Stirring was constant throughout the reflux. Clean-up consisted of transferring the mixture into a 500 ml. separatory funnel with the aid of 100 mls. of hot toluene. After cooling to ambient temperatures, 200 mls. of water was added to this solution and the mixture was shaken. An emulsion formed that took hours to break, but after it did, the bottom water layer was removed. The pH of the discarded water was tested using pH paper. If the water was found to be acidic, more water was added and the procedure was repeated. Approximately 10×200 mls. of water were needed to clean the product. After the water extraction, the remaining product was transferred to a petrie dish and the petrie dish was placed on a hot plate over low heat to evaporate the remaining water and toluene. Finally, the petrie dish was placed in a vacuum over at 105 degrees centigrade overnight. This polymer was used in Example XXVIII.

In this patent application, certain abbreviations were used, i.e.,

VAC = vinyl acetate
PVAC = polyvinyl acetate
VOH = vinyl alcohol
PVOH = polyvinyl alcohol
PVPROP = polyvinyl proprionate

What is claimed is:

1. A chewing gum composition that is devoid of preformed gum base, elastomer, oleaginous material, ester gum and polyterpene resins and comprising in weight %,
   (a) about 5 to 25% of a vinyl polymer selected from a group consisting of those having the following structural formulae:

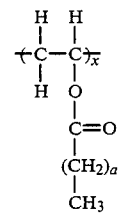

I wherein
[a] is a whole number of 1 to 8,
[x] is a whole number signifying the total number of vinyl ester units which are present in such I homopolymers,
and [x] is such that I homopolymers have a Mn value of about 25,000 to about 55,000 MWU and an Mw value of about 80,000 to about 150,000 MWU;

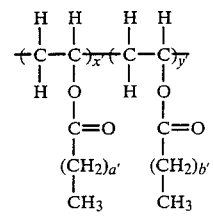

II wherein
[a'] is 0 or 1,
[b'] is a whole number of 1 to 16, with the proviso that [a'] and [b'] cannot both be 1, and
[x'] and ]y'] are whole numbers signifying the number of lower and higher vinyl ester units, respectively, which are present in the II copolymer and are such that said II copolymers have an Mn value of about 2,000 to 60,000 MWU and an Mw value of about 4,000 to 200,000 MWU;

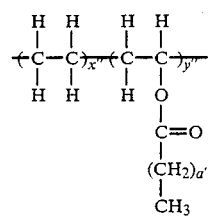

III wherein
[a''] is 0 or a whole number of 1 to 16, and

[x''] and [y''] are whole numbers signifying the numbers of ethylene and vinyl ester units, respectively, which are present in the III copolymers and are such that said III copolymers have a Mn value of about 15,000 to about 75,000 MWU and an Mw value of about 100,000 to about 450,000 MWU;

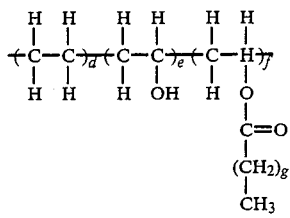

IVa wherein

[g] is a whole number of 0 to 16,

[d], [e] and [f] are whole numbers signifying the number of ethylene, vinyl alcohol and vinyl ester units, respectively, which are present in copolymer IVa and are such that said IVa copolymers have an Mn value of about 8,000 to about 73,000 MWU and an Mw value of about 95,000 to about 440,000 MWU; and

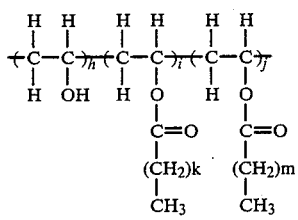

IVb wherein

[k] is a whole number of 0 or 1

[m] is a whole number of 1 to 16 with the proviso that [k] and [m] are not both 1, and

[h], [i] and [j] are whole numbers signifying the number of vinyl alcohol and lower and higher vinyl ester units, respectively, which are present in copolymer IVb and are such that said IVb copolymers have an Mn value of about 1,000 to about 55,000 MWU and an Mw value of about 2,000 to about 180,000 MWU, and mixtures of such polymers, (b) about 4 to 18% of a plasticizer for said vinyl polymer, (c) about 2 to 11% filler, (d) about 30 to 60% of solid bulk sweetener, (e) about 1 to 25% of liquid bulk sweetener, (f) about 0 to 0.75% of intense sweetener, (g) about 0.5 to 2.0% of flavorant, (h) about 0 to 0.25% of colorant, and (j) about 0.5 to 5% of emulsifier.

2. A chewing gum composition as in claim 1 in which said vinyl polymer is that of formula I.

3. A chewing gum composition as in claim 2 wherein said vinyl polymer has an Mn of about 30,000 to about 50,000 MWU and an Mw of about 100,000 to about 130,000 MWU.

4. A chewing gum composition as in claim 3 in which said vinyl polymer is polyvinyl proprionate.

5. A chewing gum composition as in claim 1 in which said vinyl polymer is that of formula II.

6. A chewing gum composition as in claim 5 in which said vinyl polymer has an Mn of about 6,000 to 50,000 MWU and an Mw of about 20,000 to 180,000 MWU.

7. A chewing gum composition as in claim 6 in which said vinyl polymer is a vinyl acetate-vinyl laurate copolymer.

8. A chewing gum composition as in claim 1 in which said vinyl polymer is that of formula III.

9. A chewing gum composition as in claim 8 in which said vinyl polymer has a Mn of about 20,000 to 55,000 MWU and an Mw of about 125,000 to about 400,000.

10. A chewing gum composition as in claim 9 in which said vinyl polymer is an ethylene-vinyl acetate copolymer.

11. A chewing gum composition as in claim 1 in which said vinyl polymer is that of formula IVa.

12. A chewing gum composition as in claim 11 in which said vinyl polymer has an Mn of about 15,000 to 50,000 MWU and an Mw of about 110,000 to 380,000 MWU.

13. A chewing gum composition as in claim 12 which is an ethylene-vinyl alcohol-vinyl acetate terpolymer.

14. A chewing gum composition as in claim 1 in which said vinyl polymer is that of formula IVb.

15. A chewing gum composition as in claim 14 in which said vinyl polymer has an Mn of about 5,000 to 45,000 MWU and an Mw of about 15,000 to 170,000 MWU.

16. A chewing gum composition as in claim 15 in which said vinyl polymer is a vinyl alcohol-vinyl acetate-vinyl laurate terpolymer.

17. A process for directly preparing a chewing gum product in a one-step mixing process which comprises admixing the (a) to (j) components of claim 1 at a temperature of about 50 to 100° C.

* * * * *

UNITED STATES PATENT AND TRADEMARK OFFICE
CERTIFICATE OF CORRECTION

PATENT NO.  : 4,968,511

DATED       : November 6, 1990

INVENTOR(S) : Ronald P. D'Amelia, et al.

It is certified that error appears in the above-identified patent and that said Letters Patent is hereby corrected as shown below:

Column 2, line 19: "employing vinyl" should read as --employing various vinyl--

Column 5, line 42: "a'" should read as --a"--

Column 16, line 63: "a'" should read as --a"--

Column 14, line 50: "PVAC 82" should read as --PVAC 82%--

Signed and Sealed this

Seventh Day of April, 1992

Attest:

HARRY F. MANBECK, JR.

Attesting Officer

Commissioner of Patents and Trademarks